(12) United States Patent
Ishii et al.

(10) Patent No.: US 11,964,604 B2
(45) Date of Patent: Apr. 23, 2024

(54) CARGO BED RAISING AND LOWERING APPARATUS OF DUMP TRUCK

(71) Applicant: Hitachi Construction Machinery Co., Ltd., Tokyo (JP)

(72) Inventors: Tomoya Ishii, Tsuchiura (JP); Kazunori Ishihara, Tsuchiura (JP); Takeshi Iwaki, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 588 days.

(21) Appl. No.: 17/274,671

(22) PCT Filed: Mar. 16, 2020

(86) PCT No.: PCT/JP2020/011318
§ 371 (c)(1),
(2) Date: Mar. 9, 2021

(87) PCT Pub. No.: WO2020/189596
PCT Pub. Date: Sep. 24, 2020

(65) Prior Publication Data
US 2021/0253014 A1    Aug. 19, 2021

(30) Foreign Application Priority Data

Mar. 19, 2019  (JP) .................................. 2019-051437

(51) Int. Cl.
*B60P 1/16* (2006.01)
*F15B 15/20* (2006.01)

(52) U.S. Cl.
CPC ................ *B60P 1/16* (2013.01); *F15B 15/20* (2013.01); *F15B 2211/605* (2013.01)

(58) Field of Classification Search
CPC .. B60P 1/06; B60P 1/045; F15B 15/20; F15B 2211/605; B60G 2300/026

(Continued)

(56) References Cited

U.S. PATENT DOCUMENTS 3,741,608 A    6/1973   Webb
4,382,632 A    5/1983   Pitts
(Continued)

FOREIGN PATENT DOCUMENTS

CN    106715212 A  *  5/2017  ........... B60R 25/209
CN    206202067 U  *  5/2017
(Continued)

OTHER PUBLICATIONS

Extended European Search Report issued in European Application No. 20772569.8 dated Nov. 11, 2022 (eight (8) pages).

(Continued)

*Primary Examiner* — Hilary L Gutman
(74) *Attorney, Agent, or Firm* — Crowell & Moring LLP

(57) ABSTRACT

When a tilt in a right-and-left direction occurs in a cargo bed (9) being raised due to imbalance of excavated materials, the tilt is detected as a roll angle (θR), and it is determined whether the absolute value (|θR|) of the roll angle is not less than an imbalance determination value (θ2) (S4). When the absolute value is not less than the imbalance determination value (θ2) (Yes in S4) and the roll angle (θR) is positive (the cargo bed (9) is rising to the right) (Yes in S8), an oil supply amount (VL) to a hoist cylinder (11) on the left side is increased, and an oil supply amount (VR) to a hoist cylinder (12) on the right side is decreased (S9). When the roll angle (θR) is negative (the cargo bed (9) is rising to the left) (No in S8), the oil supply amount (VL) on the left side is decreased, and the oil supply amount (VR) on the right side is increased (S10).

17 Claims, 12 Drawing Sheets

(58) Field of Classification Search
USPC .................................................... 298/22 C
See application file for complete search history.

(56) References Cited

U.S. PATENT DOCUMENTS

| | | | | |
|---|---|---|---|---|
| 5,742,228 | A * | 4/1998 | Levy | B60P 1/045 |
| | | | | 298/22 C |
| 5,825,284 | A * | 10/1998 | Dunwoody | B61F 5/245 |
| | | | | 340/440 |
| 9,952,115 | B2 | 4/2018 | Landes et al. | |
| 11,800,828 | B2 * | 10/2023 | Matsuzaki | B62D 6/007 |
| 2014/0336883 | A1 * | 11/2014 | Thompson | B60P 1/04 |
| | | | | 701/34.2 |
| 2016/0281334 | A1 * | 9/2016 | Iwamura | E02F 9/265 |
| 2016/0298316 | A1 * | 10/2016 | Iwamura | E02F 3/435 |
| 2017/0260717 | A1 * | 9/2017 | Seki | E02F 3/32 |
| 2019/0023098 | A1 * | 1/2019 | Iwaki | B60G 17/0424 |
| 2020/0018049 | A1 * | 1/2020 | Takahama | E02F 9/2025 |
| 2021/0156114 | A1 * | 5/2021 | Saigo | E02F 9/2228 |
| 2021/0261032 | A1 * | 8/2021 | Hayes | B60P 1/162 |
| 2022/0073323 | A1 * | 3/2022 | Mashima | B66C 23/80 |
| 2022/0185162 | A1 * | 6/2022 | Hagerskans | B60P 1/267 |
| 2022/0235758 | A1 * | 7/2022 | Tanaka | F04B 1/324 |
| 2023/0295902 | A1 * | 9/2023 | Takayama | E02F 9/262 |
| | | | | 701/50 |

FOREIGN PATENT DOCUMENTS

| | | | | |
|---|---|---|---|---|
| CN | 108803644 | A | | 11/2018 |
| ES | 2909958 | T3 * | 5/2022 | ......... B60B 35/1054 |
| FR | 2 968 602 | A1 | | 6/2012 |
| JP | H0438212 | A * | 2/1992 | |
| JP | H07276958 | A * | 10/1995 | |
| JP | 8-268137 | A | | 10/1996 |
| JP | 08268137 | A * | 10/1996 | |
| JP | 2000-302063 | A | | 10/2000 |
| JP | 2005-227269 | A | | 8/2005 |
| JP | 2012-136181 | A | | 7/2012 |
| JP | 2021054222 | A * | 4/2021 | |
| JP | 2021054610 | A * | 4/2021 | |
| WO | WO-2023189015 | A1 * | 10/2023 | |

OTHER PUBLICATIONS

Chinese-language Office Action issued in Chinese Application No. 202080004941.6 dated Jun. 27, 2022 with English translation (10 pages).

International Search Report (PCT/ISA/210) issued in PCT Application No. PCT/JP2020/011318 dated May 12, 2020 with English translation (five (5) pages).

Japanese-language Written Opinion (PCT/ISA/237) issued in PCT Application No. PCT/JP2020/011318 dated May 12, 2020 (four (4) pages).

* cited by examiner

CARGO BED RAISING AND LOWERING APPARATUS OF DUMP TRUCK

TECHNICAL FIELD

The present invention relates to a cargo bed raising and lowering apparatus of a dump truck.

BACKGROUND ART

A super-large dump truck to be used in mines and the like as shown in FIGS. 1 and 2 is known as this type of dump truck. A basic structure of the dump truck will be described based on these figures.

A cargo bed 9 is installed on a vehicle body frame 2 of a dump truck 1. The cargo bed 9 is connected to the vehicle body frame 2 via a pair of left and right hinges 10 and a pair of left and right hoist cylinders 11 and 12, and the cargo bed 9 is raised and lowered pivotally on the hinges 10 according to extension and contraction of rods 11a and 12a of the hoist cylinders 11 and 12.

A dump truck 1 being operated in a mine or the like is stopped in a seating position where the cargo bed 9 is seated on the vehicle body frame 2 as shown in FIG. 1, for example, in a stope for crushed stone, earth and sand and the like (hereinafter referred to as excavated materials), and the excavated materials are loaded onto the cargo bed 9 by a hydraulic shovel or the like. When the loading is completed, the dump truck 1 travels to a predetermined soil dumping site, and the hoist cylinders 11 and 12 are driven to raise the cargo bed 9 to a discharging position shown in FIG. 2. As a result, the excavated materials slide down on the cargo bed, and are discharged to the ground surface. Thereafter, the dump truck 1 switches the cargo bed 9 to the seating position, and returns to the stope. As described above, the loading of the excavated materials at the stope and the discharge of the excavated materials at the soil dumping site are repeated.

In order to enhance the efficiency of transporting excavated materials by the dump truck 1, it is important to load the excavated materials on the cargo bed up to a predetermined rated load weight, and a technique described in Patent Document 1 has been proposed as a technique for the above purpose.

In the technique of Patent Document 1, a vertical component of a load acting on each suspension of the dump truck is determined as a total load under loading based on detection values of front and rear pressure sensors provided to the front and rear suspensions of the dump truck, and a front-rear tilt angle of the dump truck detected by a tilt sensor, and a current load weight of the cargo bed is determined based on the total load weight under loading—an initial load under empty load.

PRIOR ART DOCUMENT

Patent Document

Patent Document 1: Japanese Patent Laid-Open No. 2005-227269

SUMMARY OF THE INVENTION

Problems to be Solved by the Invention

In order to smoothly raise and lower the cargo bed 9, it is taken into consideration that hydraulic oil is evenly supplied to the left and right hoist cylinders 11 and 12, so that substantially the same driving forces are transmitted to the cargo bed 9. However, this measure is based on the premise that the left and right hoist cylinders 11 and 12 receive loads evenly from the cargo bed 9, and a problem occurs in a status described below.

For example, excavated materials are not always evenly loaded on the cargo bed 9 by a hydraulic shovel or the like, and when imbalance of the excavated materials occurs in a right-and-left direction to cause the cargo bed 9 to tilt in the right-and-left direction, the loads which the left and right hoist cylinders 11 and 12 receive from the cargo bed 9 become uneven. Further, when the soil dumping site is a slope in the right-and-left direction, unevenness in loading also occurs. In such a status, even when the hydraulic oil is evenly supplied to the left and right hoist cylinders 11 and 12 and the cargo bed 9 is raised by substantially the same driving force, the loads received from the cargo bed 9 are uneven, so that a difference occurs in extension speed between the left and right hoist cylinders 11 and 12.

Such a difference in extension speed has caused a problem that the cargo bed 9 is tilted in the right-and-left direction, and excessive stress occurs in the hinges 10 for connecting the cargo bed 9 to the vehicle body frame 2, which causes damage to the hinges 10 through a repetitive discharging operation of excavated materials. In Patent Document 1, the tilt angle of the vehicle body in the front-and-rear direction is detected, but this is only for calculating the vertical component of the load, and no consideration is given to the tilt in the right-and-left direction of the cargo bed itself.

The present invention has been made to solve such a problem, and an object of the present invention is to provide a cargo bed raising and lowering apparatus of a dump truck in which even when there is imbalance of excavated materials on a cargo bed in a right-and-left direction or even when the dump truck stops on a slope extending in the right-and-left direction, by extending left and right hoist cylinders substantially evenly while the cargo bed is raised, a burden on the hinges which connect the cargo bed to a vehicle body frame can be reduced, thereby preventing damage to the hinges.

Means for Solving the Problems

In order to attain the above object, according to the present invention, a cargo bed raising and lowering apparatus of a dump truck in which a cargo bed is connected to a vehicle body frame so that the cargo bed can be raised and lowered pivotally on a hinge, a flow path of hydraulic oil to be discharged from a hydraulic source is switched by a control valve according to an operation of a hoisting operation device to supply the hydraulic oil to each of a pair of hoist cylinders arranged at left and right end portions of the cargo bed in a vehicle width direction, and the cargo bed is raised or lowered according to extension or contraction of the hoist cylinders, the cargo bed raising and lowering apparatus comprises: an oil supply amount adjusting unit capable of individually adjusting oil supply amounts of the hydraulic oil to the pair of hoist cylinders; a cargo bed tilt detecting unit for detecting a tilt in the vehicle width direction of the cargo bed; an oil supply amount calculating unit for calculating the amount of the hydraulic oil to be supplied to each of the hoist cylinders based on the tilt of the cargo bed detected by the cargo bed tilt detecting unit; and an oil supply amount control unit for controlling to drive the oil supply amount adjusting unit based on the amount of the hydraulic oil to be supplied to each of the hoist cylinders calculated by the oil supply amount calculating unit.

Advantageous Effects of the Invention

According to the cargo bed raising and lowering apparatus of a dump truck of the present invention, even when excavated materials on the cargo bed have imbalance in the right-and-left direction or the dump truck stops at a slope in the right-and-left direction, hoist cylinders on the right and left sides are substantially evenly extended while the cargo bed is rising, whereby a burden on hinges connecting the cargo bed to a vehicle body frame can be reduced to prevent the hinges from being damaged.

MODE FOR CARRYING OUT THE INVENTION

Hereinafter, an embodiment of a cargo bed raising and lowering apparatus of a dump truck that embodies the present invention will be described.

Figure 1:
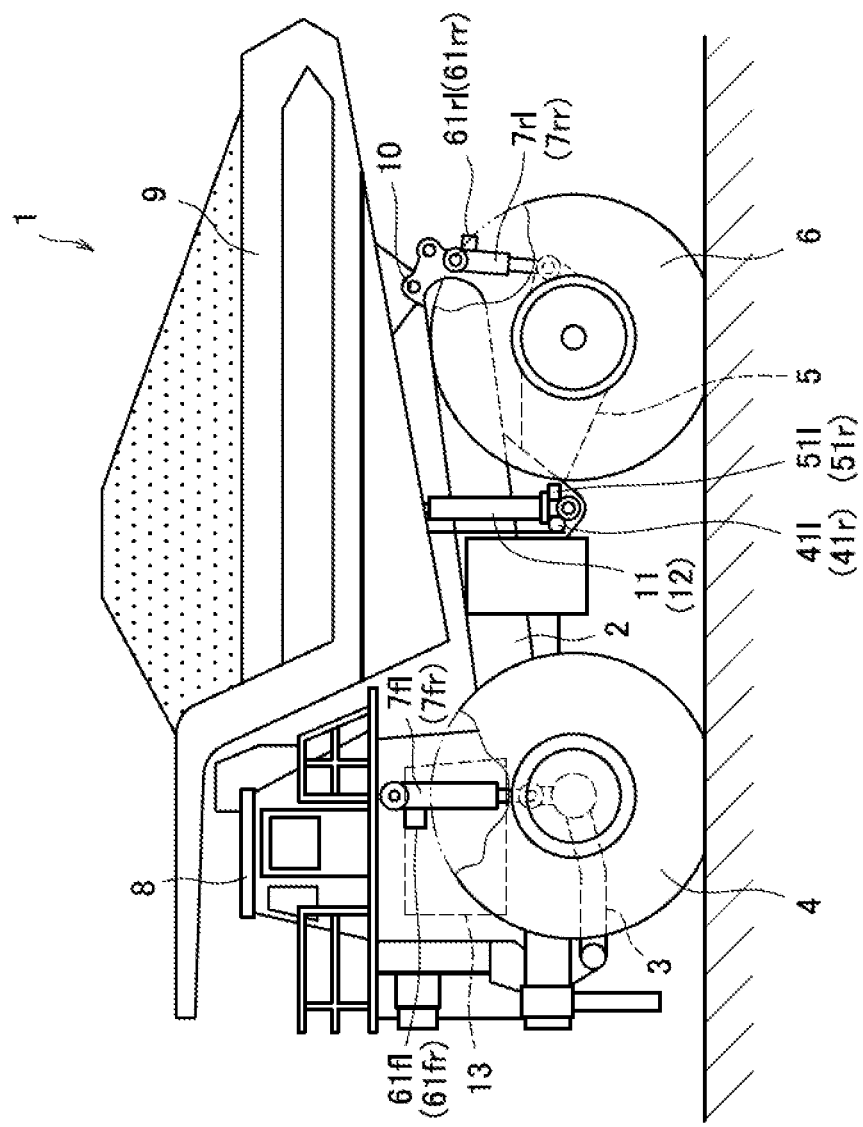
FIG. 1 is a side view showing a state in which a cargo bed of a dump truck to which a cargo bed raising and lowering apparatus of an embodiment is applied is set in a seating position.
Figure 2:
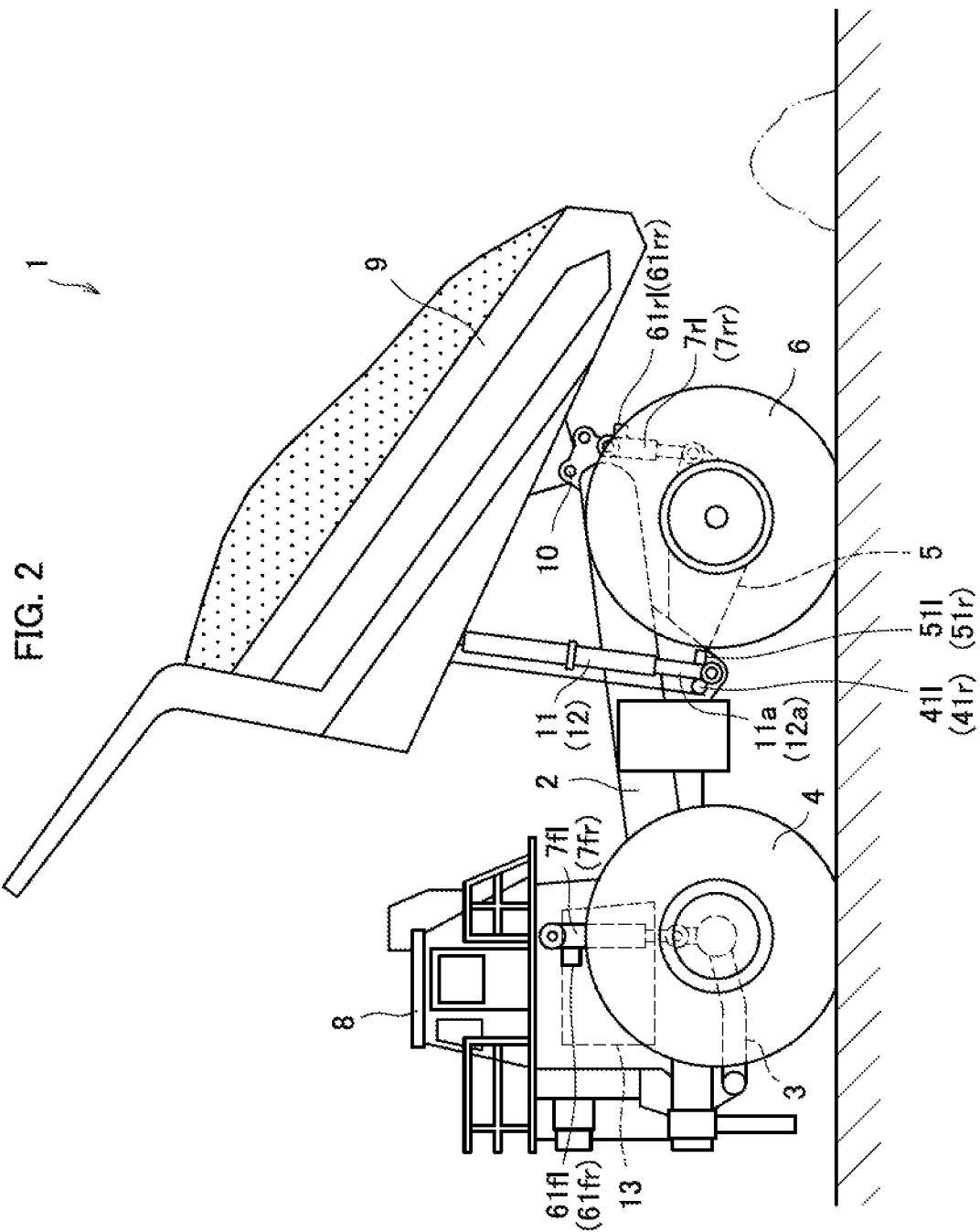
FIG. 2 is a side view showing a state in which the cargo bed of the dump truck is set in a discharging position.

FIG. 1 is a side view showing a state in which the cargo bed of the dump truck to which the cargo bed raising and lowering apparatus of the present embodiment is applied is set in a seating position, and FIG. 2 is a side view showing a state in which the cargo bed of the dump truck is also set in a discharging position. The dump truck is used to transport excavated materials (crushed stones, earth and sand, etc.) mined in a mine or the like, and in the following description, a front-and-rear direction, a right-and-left direction, and an up-and-down direction are expressed based on the field of view of an operator getting on the dump truck.

Left and right front wheels 4 (wheels) are supported by a vehicle body frame 2 of the dump truck 1 via front suspensions 3, and left and right rear wheels 6 (wheels) are supported via rear suspensions 5. The four wheels 4 and 6 in the front-and-rear and right-and-left directions are independently suspended by these four suspensions 3 and 5, and a cushioning effect and a damping effect are exerted by a pair of left and right suspension cylinders 7$fl$ and 7$fr$ constituting the front-side suspensions 3, and a pair of left and right suspension cylinders 7$rl$ and 7$rr$ constituting the rear-side suspensions 5. A cargo bed 9 for loading excavated materials thereon is installed on the vehicle body frame 2, and the cargo bed 9 is connected to the vehicle body frame 2 via a pair of left and right hinges 10 and a pair of hoist cylinders 11 and 12 arranged at left and right end portions of the cargo bed 9. The cargo bed 9 is raised and lowered pivotally on the hinges 10 between a seating position shown in FIG. 1 and a discharging position shown in FIG. 2 according to extension/contraction of rods 11$a$ and 12$a$ of the respective hoist cylinders 11 and 12.

An engine 13 serving as a prime mover is installed as a power source for traveling at a front portion on the vehicle body frame 2, and also a driver's cab 8 is provided at the front portion on the vehicle body frame 2. Various operating devices including a hoisting operation device 31 (shown in FIG. 3) for raising and lowering the cargo bed 9 as described later are provided inside the driver's cab 8.

In a stope where excavated materials are excavated in a mine or the like, the excavated materials are loaded onto the cargo bed 9 of the dump truck 1 by a hydraulic shovel or the like while the cargo bed 9 is seated in the seating position. When the loading is completed, the dump truck 1 travels to a soil dumping site, switches the cargo bed 9 to the discharging position to discharge the excavated materials, then returns to the stope to load crushed stones, etc., and repeats the above operation.

Figure 3:
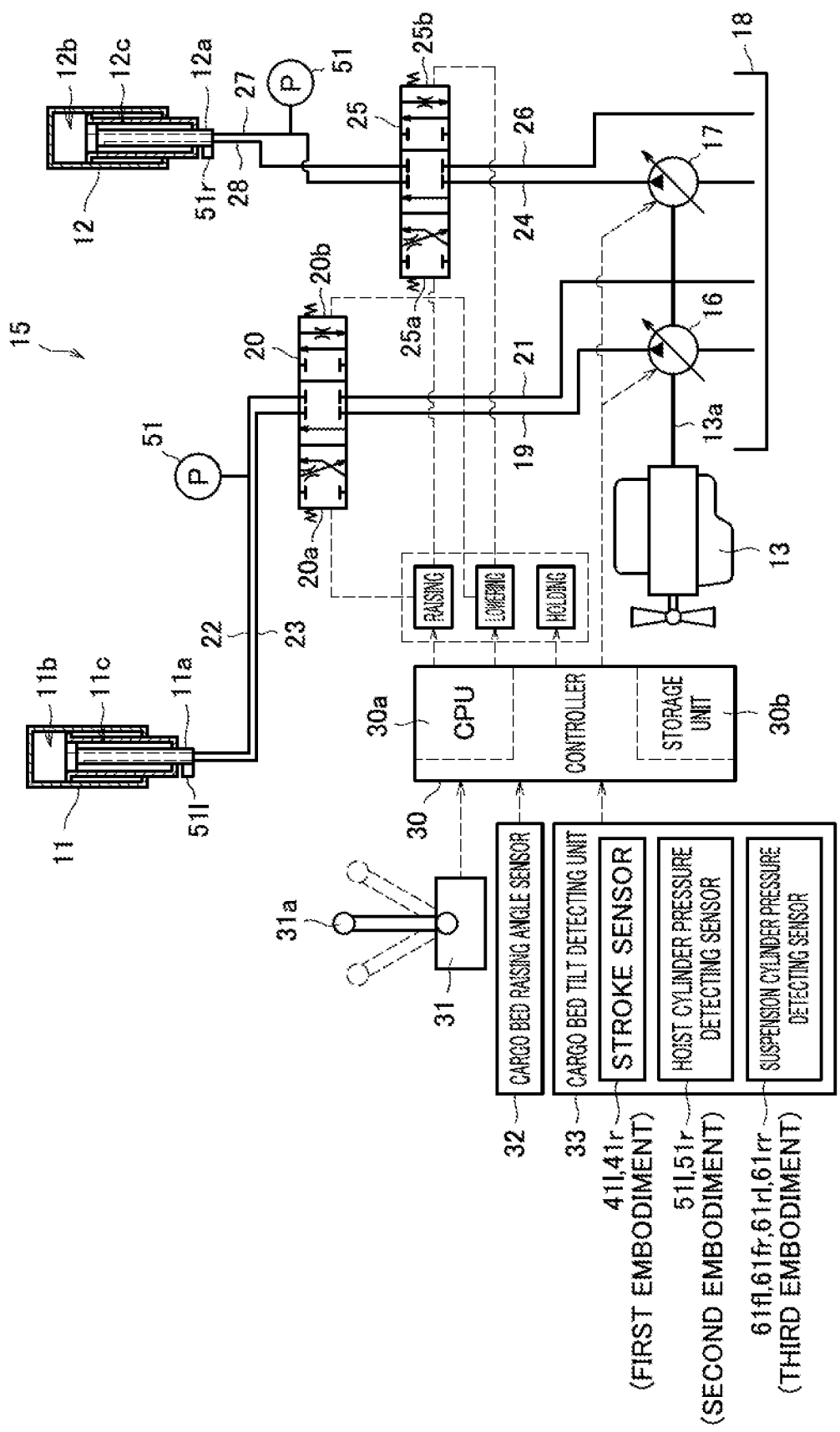
FIG. 3 is a hydraulic circuit diagram showing the cargo bed raising and lowering apparatus according to the embodiment.

FIG. 3 is a hydraulic circuit diagram showing the cargo bed raising and lowering apparatus of the present embodiment.

A pair of hydraulic pumps 16 and 17 (hydraulic source, oil supply amount adjusting unit) of the cargo bed raising and lowering apparatus 15 are connected to an output shaft 13$a$ of the engine 13 (hydraulic source) described above and are driven by the engine 13 to discharge hydraulic oil in a hydraulic oil tank 18. Each of the hydraulic pumps 16 and 17 is configured as a variable displacement delivery type, and the discharge amount of hydraulic oil can be freely adjusted according to the control of the tilting angle by a regulator (not shown). The left and right hoist cylinders 11 and 12 described above are driven by the hydraulic oil supplied from these hydraulic pumps 16 and 17, respectively, and the hydraulic circuits of the hoist cylinders 11 and 12 have the same configuration, and are provided independently of each other.

The discharge side of the hydraulic pump 16 is connected to a control valve 20 via a pump pipe line 19, and the control valve 20 is connected to the hydraulic oil tank 18 via a tank pipe line 21. Further, the control valve 20 is connected to the hoist cylinder 11 via a pair of cylinder pipe lines 22 and 23, and one cylinder pipe line 22 communicates with an oil chamber 11$b$ on the bottom side while the other cylinder pipe line 23 communicates with an oil chamber 11$c$ on the rod side.

The discharge side of the hydraulic pump 17 is connected to a control valve 25 via a pump pipe line 24, and the control valve 25 is connected to the hydraulic oil tank 18 via a tank pipe line 26. Further, the control valve 25 is connected to the hoist cylinder 12 via a pair of cylinder pipe lines 27 and 28, and one cylinder pipe line 27 communicates with an oil chamber 12b on the bottom side while the other cylinder pipe line 28 communicates with an oil chamber 12c on the rod side.

The control valves 20 and 25 are configured, for example, as hydraulic pilot type directional control valves, and are switched among three positions of a neutral position, a rising position, and a falling position according to an input of pilot pressure to pairs of pilot pressure receiving portions 20a and 20b, 25a and 25b. At the neutral position of the control valves 20 and 25, the hydraulic oil from the hydraulic pumps 16 and 17 is shut off, and inflow and outflow of the hydraulic oil into and from the oil chambers 11b, 11c, 12b and 12c of the hoist cylinders 11 and 12 are restricted, whereby the operating states of the hoist cylinders 11 and 12 at that time are maintained, and eventually, the position to which the cargo bed 9 is raised or lowered is maintained.

When the control valves 20 and 25 are switched to the rising position, the hydraulic oil from the hydraulic pumps 16 and 17 is supplied to the oil chambers 11b and 12b on the bottom side of the hoist cylinders 11 and 12 via one of the cylinder pipe lines 22 and 27, whereby the cargo bed 9 is raised due to the extension of the rods 11a and 12a, and the hydraulic oil in the oil chambers 11c and 12c on the rod side passes through the other cylinder pipe lines 23 and 28 and the tank pipe lines 21 and 26, and then is returned to the hydraulic oil tank 18. Further, when the control valves 20 and 25 are switched to the falling position, the hydraulic oil from the hydraulic pumps 16 and 17 passes through the other cylinder pipe lines 23 and 28 and enters the oil chambers 11c and 12c on the rod side of the hoist cylinders 11 and 12, whereby the cargo bed 9 is lowered due to the contraction of the rods 11a and 12a, and the hydraulic oil in the oil chambers 11b and 12b on the bottom side passes through one of the cylinder pipe lines 22 and 27 and the tank pipe lines 21 and 26 on one side, and then returned to the hydraulic oil tank 18.

In the present embodiment, since the hydraulic circuits of the hoist cylinders 11 and 12 are independent of each other, the amounts of hydraulic oil to be supplied to the hoist cylinders 11 and 12 (oil supply amounts VL and VR described later) can be individually adjusted by controlling tilting angles of the hydraulic pumps 16 and 17, respectively.

As shown in FIG. 3, a controller 30 for controlling the cargo bed raising and lowering apparatus 15 is configured by CPU 30a (central processing unit), a storage unit 30b (ROM, RAM, non-volatile RAM or the like), an input/output unit (not shown), and the like. A hoisting operation device 31 for performing a hoisting operation on the cargo bed 9, a cargo bed raising angle detecting sensor 32 for detecting a raising angle θL of the cargo bed 9, and a cargo bed tilt detecting unit 33 are connected to an input side of the controller 30. The cargo bed tilt detecting unit 33 plays a role of detecting an index correlating with the tilt in the right-and-left direction of the cargo bed 9 which is caused by imbalance of excavated materials loaded on the cargo bed 9. However, different sensors are used in respective embodiments described below, and thus the detailed description thereof will be described for each of the embodiments.

Further, respective regulators of the hydraulic pumps 16 and 17 described above and respective pilot pressure receiving portions 20a, 20b and 25a, 25b of the control valves 20 and 25 are connected to an output side of the controller 30.

An operating lever 31a of the hoisting operation device 31 is switched among three positions of a holding position, a raising position, and a lowering position by an operator. When the operating lever 31a is operated, the controller 30 controls the regulators of the hydraulic pumps 16 and 17 to discharge hydraulic oil, and outputs a command signal corresponding to the position of the operating lever 31a to the pilot pressure receiving portions 20a, 20b, 25a, 25b of the control valves 20 and 25 to perform switching. Specifically, the control valves 20 and 25 are switched to the neutral position at the holding position, the control valves 20 and 25 are switched to the rising position at the raising position, and are switched to the falling position at the lowering position, whereby the cargo bed 9 is raised and lowered by driving the hoist cylinders 11 and 12 according to the operation of the operating lever 31a.

As described in [Problems to be solved by the Invention], if there is imbalance of excavated materials on the cargo bed 9 in the right-and-left direction when the cargo bed 9 is raised, a difference occurs in extension speed between the left and right hoist cylinders 11 and 12 due to unevenness of load received from the cargo bed 9, which causes a problem that an excessive stress occurs in the hinges 10 through which the cargo bed 9 is connected to the vehicle body frame 2.

Therefore, in the present invention, the amounts of hydraulic oil to be supplied to the left and right hoist cylinders 11 and 12 are controlled based on the index correlating with the tilt of the cargo bed 9 detected by the cargo bed tilt detecting unit 33, and the details thereof will be described below as first to third embodiments.

First Embodiment

Figure 4:
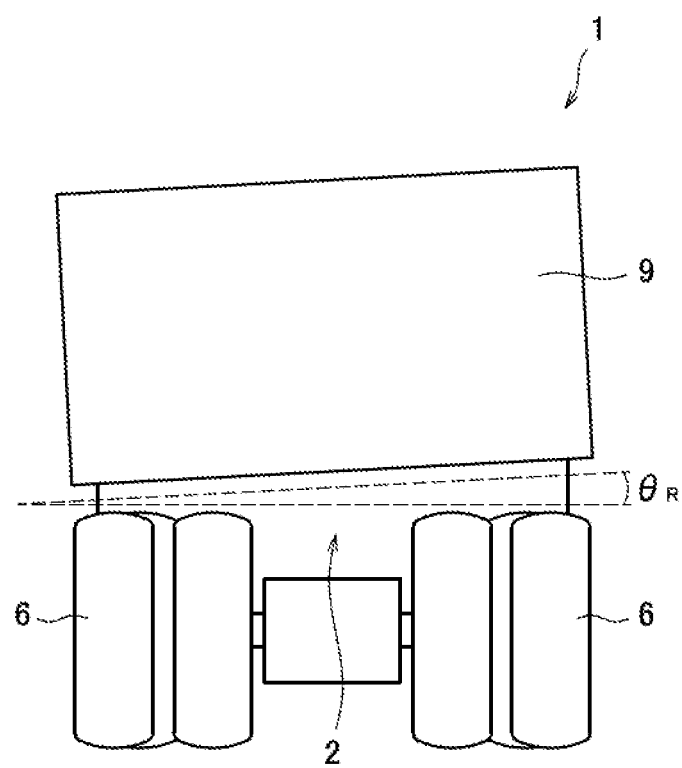
FIG. 4 is a rear view of the dump truck which shows an occurrence status of a roll angle θR occurring in the cargo bed.

In the present embodiment, a roll angle θR is adopted as the index correlating with the tilt of the cargo bed 9, and as shown in FIG. 4 in which the dump truck 1 is viewed from the rear side, the roll angle θR is a tilt angle in the right-and-left direction which the cargo bed 9 forms with respect to the vehicle body frame 2. In order to detect the roll angle θR, a stroke sensor 41 is provided at a front portion of the lower surface of the cargo bed 9 as the cargo bed tilt detecting unit 33.

For example, an optical range finder may be used as the stroke sensor 41, but a stroke sensor which is configured as a more reliable structure so as to be capable of detecting the distance between the cargo bed 9 and the vehicle body frame 2 may be used in a mine where there is a concern that dust adheres to the optical sensor. In this configuration, a potentiometer (not shown) which is configured to pull in a wire rod by a built-in spring and acquire an electric signal corresponding to a pull-out amount of the wire rod is used, the tip of a wire rod is fixed to a neighborhood of a hoist cylinder connection point on the side of the cargo bed 9 rising and lowering from the seating state, the potentiometer for pulling in the wire rod is fixed to a neighborhood of a hoist cylinder connection point on the side of the vehicle body frame 2, and the distance between the cargo bed 9 and the vehicle body frame 2 is detected with the seating state of the cargo bed 9 being set as an initial state. Since the distances detected by a pair of left and right stroke sensors 41l and 41r correlate with the strokes of the hoist cylinders 11 and 12 respectively, they are referred to as stroke sensors 41l and 41r for detecting cylinder strokes in the following description. The roll angle θR of the cargo bed 9 is calculated by the controller 30 based on the difference between the cylinder strokes detected by the left and right stroke sensors 41*l* and 41*r* (roll angle calculating unit).

Figure 5:
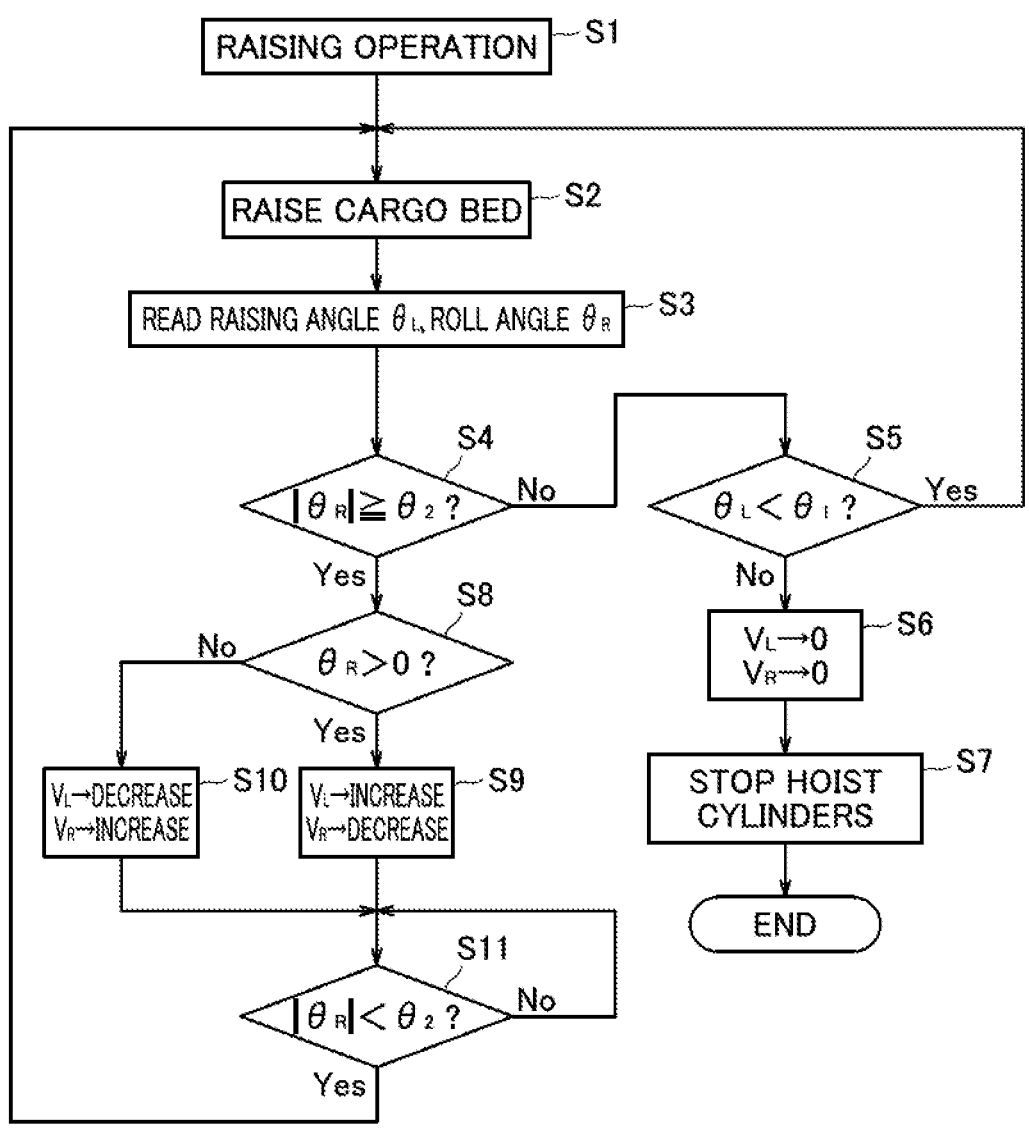
FIG. 5 is a flowchart showing a cargo bed tilt suppressing routine to be executed by a controller of a first embodiment.

When the operating lever 31*a* of the hoisting operation device 31 is operated to the raising position, the controller 30 executes the cargo bed tilt suppressing routine shown in FIG. 5 at a predetermined control interval. Note that a program and the like for executing this routine are stored in the storage unit 30*b* in advance, and this point is the same for the other embodiments.

When the operation to the raising position is performed in step 1, first, in step 2, the tilting angles of the hydraulic pumps 16 and 17 are controlled to discharge the hydraulic oil, and also the control valves 20 and 25 are switched to the rising position to start the raising of the cargo bed 9. At this time, the same amount of hydraulic oil is supplied from the hydraulic pumps 16 and 17 to the hoist cylinders 11 and 12. However, in a status where imbalance occurs in excavated materials on the cargo bed 9 as described below, the amounts of hydraulic oil to be supplied to the left and right hoist cylinders 11 and 12 (=the discharge amounts from the hydraulic pumps 16 and 17) are controlled to be set to different values. Therefore, in the following description, the amount of oil to be supplied to the hoist cylinder 11 on the left side is denoted by VL, and the amount of oil to be supplied to the hoist cylinder 12 on the right side is denoted by VR, thereby distinguishing the amounts of oil to be supplied to the hoist cylinders 11 and 12 from each other.

Further, even in the case of the same roll angle $\theta R$, the control contents of the oil supply amounts VL and VR to the left and right hoist cylinders 11 and 12 are different from each other according to whether the cargo bed 9 tilts in the right-and-left direction. Therefore, as shown in FIG. 4, the roll angle $\theta R$ when the cargo bed 9 is in a posture where the cargo bed 9 tilts up on the right side is denoted by a sign of positive (+), and the roll angle $\theta R$ when the cargo bed 9 is in a posture where the cargo bed 9 tilts up on the left side is denoted by a sign of negative (−), thereby distinguishing the postures from each other.

In step 3, the raising angle $\theta L$ detected by the cargo bed raising angle detecting sensor 32 is read, and the roll angle $\theta R$ of the cargo bed 9 is calculated based on the cylinder strokes detected by the stroke sensors 41*l* and 41*r*. In subsequent step 4, it is determined whether the absolute value $|\theta R|$ of the roll angle $\theta R$ is not less than a preset imbalance determination value $\theta 2$ (upper limit threshold value) or not. The imbalance determination value $\theta 2$ is a threshold value which is set based on a lower limit value of the roll angle $\theta R$ that affects the operation of the hinges 10. When the determination is No (negative), the imbalance of the excavated materials is little, and it does not reach a level affecting the operation of the hinges 10, so that the processing shifts to step 5.

In step 5, it is determined whether the raising angle $\theta L$ detected by the cargo bed raising angle detecting sensor 32 is less than a discharge upper limit position determination value $\theta 1$ preset by adding a safety margin to a stroke end which is a physical extension limit of each of the hoist cylinders 11 and 12 as a value corresponding to the discharge upper limit position of the cargo bed 9. When the determination is Yes (affirmative), it is assumed that the cargo bed 9 has not yet reached the discharge upper limit position, and the processing returns to step 2. When the imbalance of the excavated materials is little and the cargo bed 9 has not reached the discharge upper limit position as described above, the processing of steps 2 to 5 is repeated to continue the raising of the cargo bed 9.

When the determination in step 5 becomes No due to the arrival of the cargo bed 9 at the discharge upper limit position, the oil supply amounts VL and VR are set to 0 to stop the flow amount control of the hydraulic pumps 16 and 17 in step 6, the respective hoist cylinders 11 and 12 are stopped in step 7, and the routine is terminated.

Further, when the determination in step 4 becomes Yes before the cargo bed 9 has reached the discharge upper limit position, the processing shifts to step 8 to determine whether the roll angle $\theta R$ exceeds 0 (is a positive value) or not. When the determination of Yes is made in step 8, the processing shifts to step 9 to increase the oil supply amount VL to the left hoist cylinder 11 by a predetermined amount and decrease the oil supply amount VR to the right hoist cylinder 12 by a predetermined amount (oil supply amount calculating unit), and the hydraulic pumps 16 and 17 are controlled to be driven based on these oil supply amounts VL and VR (oil supply amount control unit). Thereafter, the processing shifts to step 11 to determine whether the absolute value $|\theta R|$ of $\theta R$ becomes less than the imbalance determination value $\theta 2$. When the determination is No, the processing of step 11 is repeated, and when the determination becomes Yes, the processing returns to step 2.

When the determination of No is made in step 8, the processing shifts to step 10 to decrease the oil supply amount VL to the left hoist cylinder 11 by a predetermined amount and increase the oil supply amount VR to the right hoist cylinder 12 by a predetermined amount (oil supply amount calculating unit), and the hydraulic pumps 16 and 17 are controlled to be driven (oil supply amount control unit), and then the processing shifts to step 11.

In this way, the oil supply amounts VL and VR to the left and right hoist cylinders 11 and 12 are appropriately adjusted according to the roll angle $\theta R$, and when the cargo bed 9 has reached the discharge upper limit position during that time and the determination in step 5 becomes No, the routine is terminated after executing the processing of steps 6 and 7.

Figure 6:
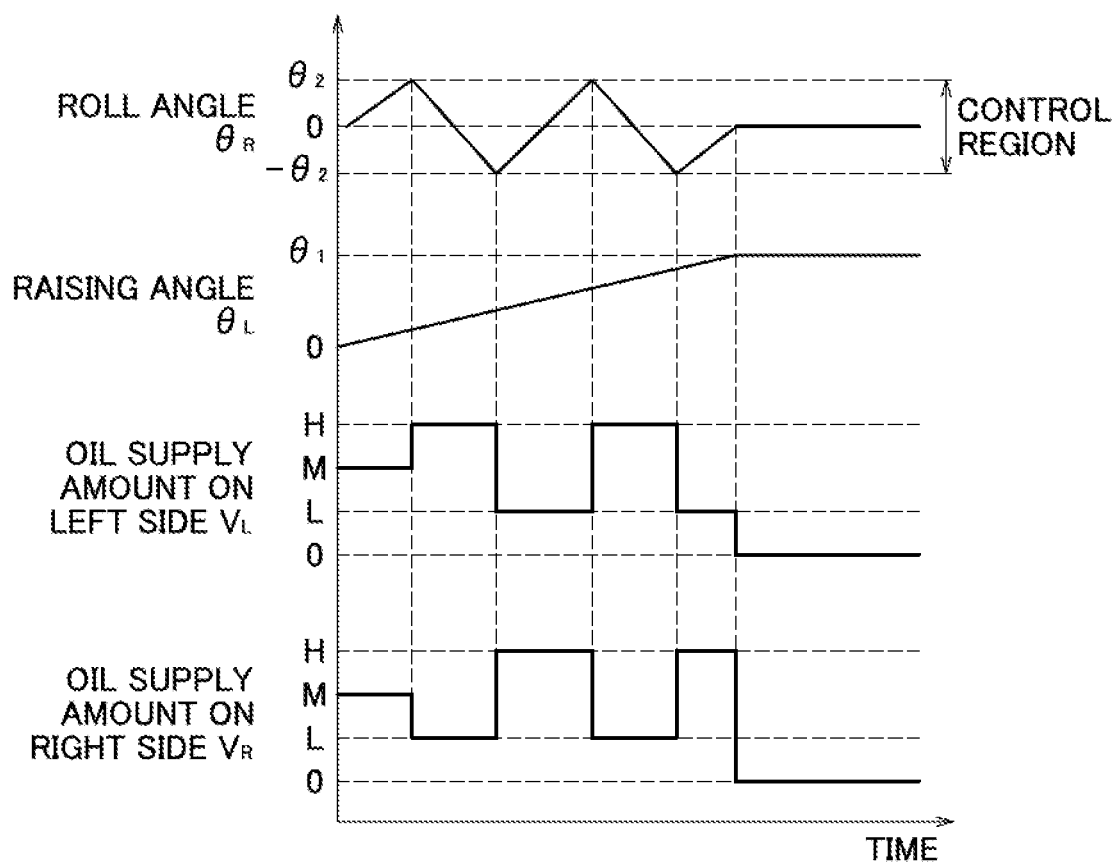
FIG. 6 is a time chart showing a control status of a roll angle, a rise angle, and an oil supply amount based on the cargo bed tilt suppressing routine.

FIG. 6 is a time chart showing the control status of the roll angle $\theta R$, the raising angle $\theta L$, and the oil supply amounts VL and VR based on the above-mentioned cargo bed tilt suppressing routine.

At the beginning of the raising of the cargo bed 9, the oil supply amounts VL and VR to the left and right hoist cylinders 11 and 12 are controlled to be equal to the value M, but it can be guessed that the roll angle $\theta R$ gradually increases to a positive side due to the imbalance of the excavated materials, and thus the cargo bed 9 is postured to tilt up on the right side. When the roll angle $\theta R$ increases up to the imbalance determination value $\theta 2$, the oil supply amount VL on the left side is increased up to H, and the oil supply amount VR on the right side is decreased down to L, so that the roll angle $\theta R$ changes to decrease and the posture of the cargo bed 9 changes from an upper-right tilt posture through a horizontal posture to an upper-left tilt posture. When the roll angle $\theta R$ decreases down to the imbalance determination value $-\theta 2$, the oil supply amount VL decreases down to L, and the oil supply amount VR increases up to H, so that the roll angle $\theta R$ changes to increase.

By increasing or decreasing the oil supply amounts VL and VR as described above, the left and right hoist cylinders 11 and 12 are substantially equally extended while the roll angle $\theta R$ is changed within a control region defined by $\theta 2$ and $-\theta 2$ while the cargo bed 9 is rising. During this operation, the raising angle $\theta L$ also continues to increase as the cargo bed 9 rises, and when that value reaches the discharge upper limit position determination value θ1, the cargo bed 9 has reached the discharge upper limit position, and a series of control ends.

As described above, according to the cargo bed raising and lowering apparatus 15 of the dump truck 1 of the present embodiment, when a roll angle θR enough to affect the hinges 10 occurs in the cargo bed 9 during rising of the cargo bed 9 (step 4 of FIG. 5 is Yes), the oil supply amounts VL and VR to the left and right hoist cylinders 11 and 12 are increased or decreased so as to reduce the roll angle θR (steps 8 to 10). Therefore, even when there is imbalance of the excavated materials on the cargo bed 9 in the right-and-left direction, the roll angle θR of the cargo bed 9 that is rising can be kept within the control region shown in FIG. 6, and the burden on the hinges 10 can be reduced and thus prevented from being damaged.

Figure 7:
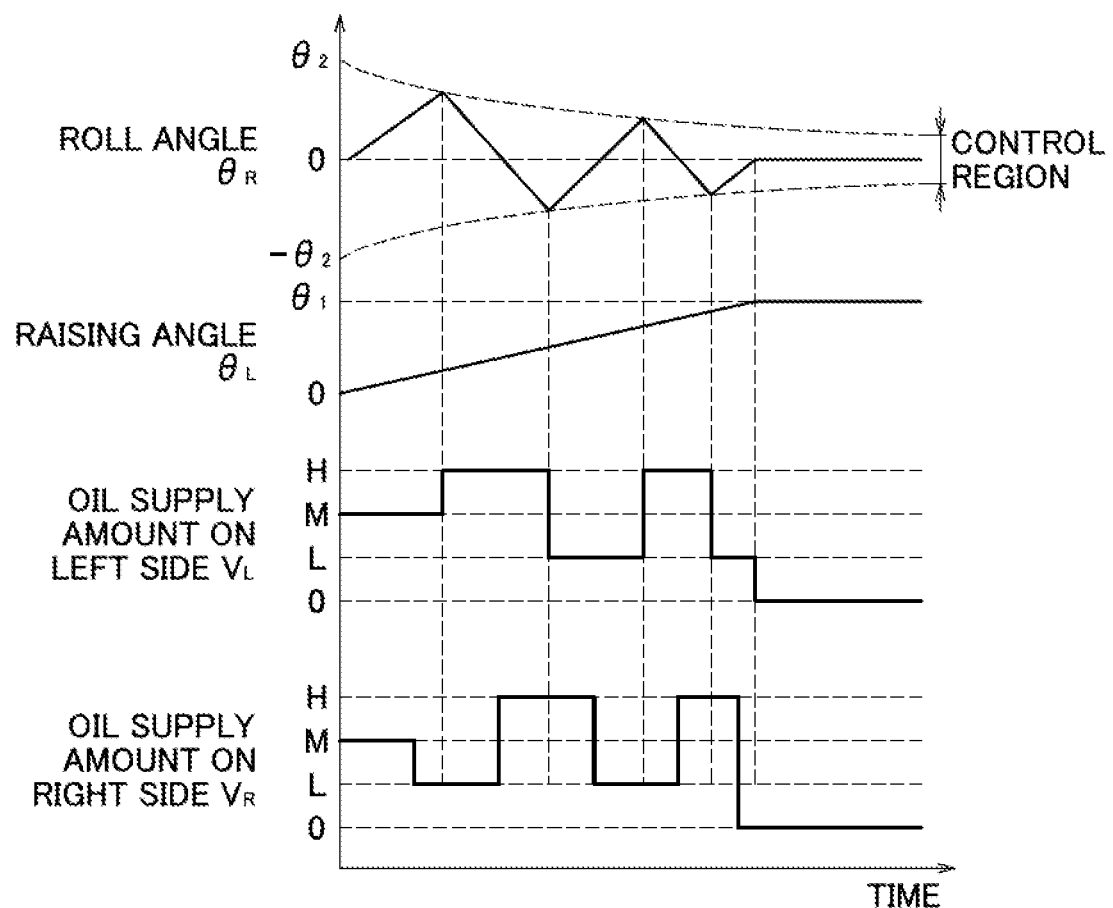
FIG. 7 is a time chart showing another example of the control status based on the cargo bed tilt suppressing routine.

In the present embodiment, the imbalance determination value θ2 is set as a fixed value, but the imbalance determination value θ2 may be, gradually decreased as the raising angle θL of the cargo bed 9 increases. In this case, as shown in FIG. 7, the control region defined by θ2 and −θ2 is gradually reduced and the fluctuation range of the roll angle θR is narrowed, so that the stress occurring in the hinges 10 can be further reduced.

Second Embodiment

Next, a second embodiment that embodies the present invention will be described. In the present embodiment, the pressures in the oil chambers 11b and 12b on the bottom sides of the left and right hoist cylinders 11 and 12 (hereinafter referred to as hoist cylinder pressure) are adopted as an index correlating with the tilt of the cargo bed 9. In order to detect the hoist cylinder pressure, a pair of left and right hoist cylinder pressure detecting sensors 51l and 51r (shown in FIGS. 1 to 3) are provided as the cargo bed tilt detecting unit 33 in the hoist cylinders 11 and 12 or in the cylinder pipe lines 22 and 27 communicating with the oil chambers 11b and 12b on the bottom sides of the hoist cylinders 11 and 12, respectively. Note that the hoist cylinder pressure is denoted by PL for that on the left side and PR for that on the right side, thereby distinguishing the hoist cylinder pressure between the left and right sides.

Figure 8:
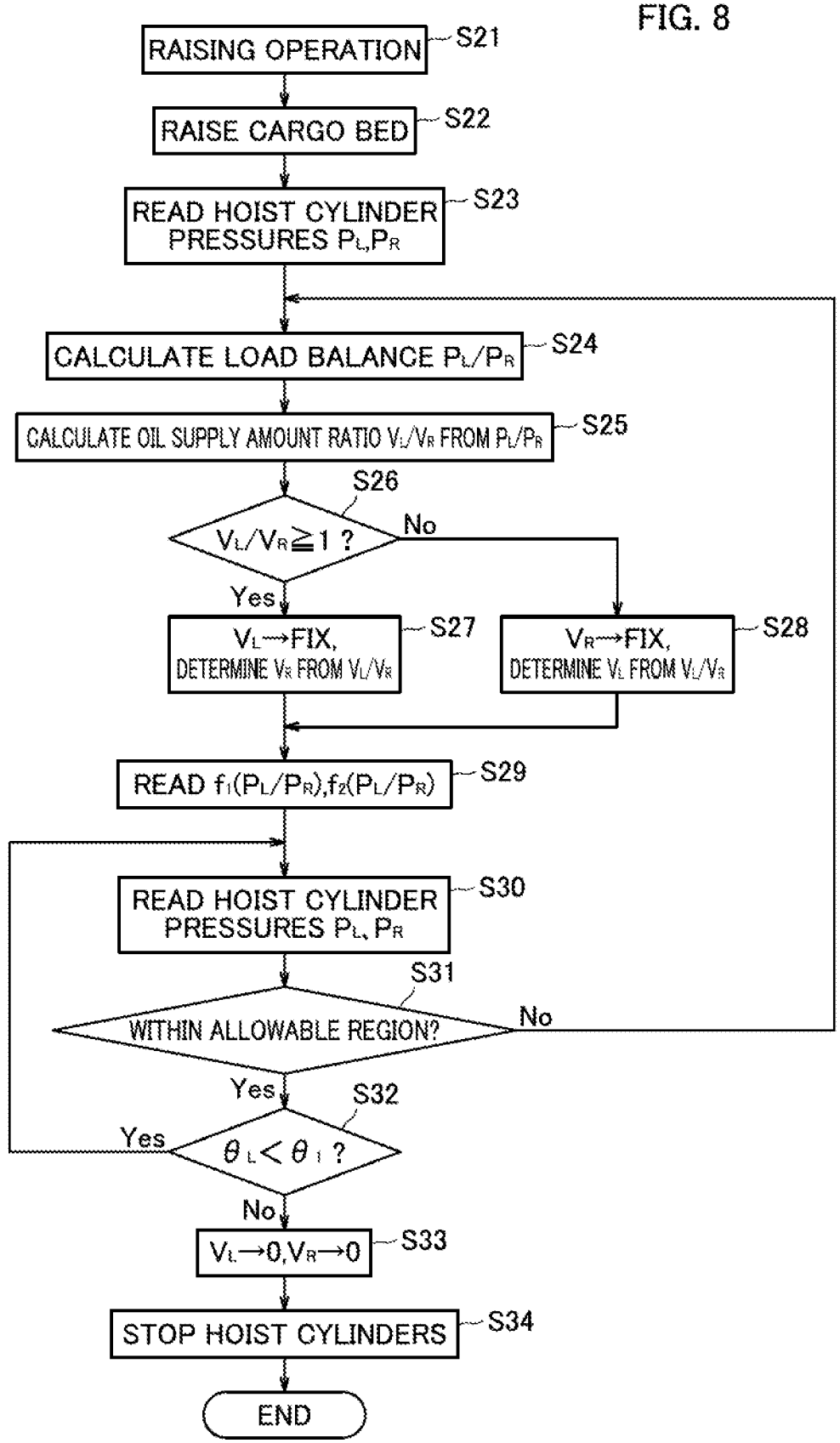
FIG. 8 is a flowchart showing a cargo bed tilt suppressing routine to be executed by a controller of a second embodiment.

When the operating lever 31a of the hoisting operation device 31 is operated to the raising position, the controller 30 executes the cargo bed tilt suppressing routine shown in FIG. 8 at a predetermined control interval.

When the operation to the raising position is performed in step 21, the raising of cargo bed 9 is started in step 22, and the hoist cylinder pressures PL and PR detected by the left and right hoist cylinder pressure detecting sensors 51l and 51r are read in step 23. Thereafter, in step 24, the load balance PL/PR in the right-and-left direction of the cargo bed 9 is calculated based on the hoist cylinder pressures PL and PR, and the ratio VL/VR of the oil supply amounts to the left and right hoist cylinders 11 and 12 is calculated from the load balance PL/PR based on the control map shown in FIG. 9 which is preset in step 25.

Figure 9:
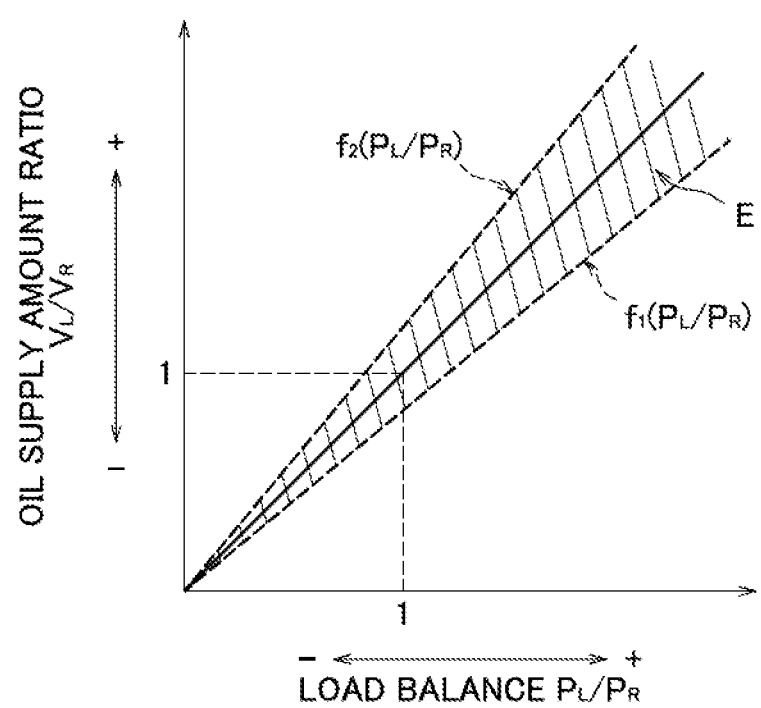
FIG. 9 is a diagram showing a control map for calculating an oil supply amount ratio to left and right hoist cylinders from a load balance of the cargo bed.

As indicated by a solid line in FIG. 9, the load balance PL/PR and the oil supply amount ratio VL/VR are set to have a proportional relationship. Therefore, they are set so that when the load balance PL/PR increases to the positive side (the cargo bed 9 rises on the right side) with respect to a boundary represented by PL/PR:VL/VR=1:1, the oil supply amount ratio VL/VR also increases to the positive side (increase on the left side and decrease on the right side), and when the load balance PL/PR increases to the negative side (the cargo bed 9 rises on the left side) with respect to the boundary, the oil supply amount ratio VL/VR also increases to the negative side (decrease on the left side and increase on the right side).

In subsequent step 26, it is determined whether the oil supply amount ratio VL/VR is not less than 1, and when the determination of Yes is made, the processing shifts to step 27. In step 27, after the oil supply amount VL to the hoist cylinder 11 on the left side, the oil supply amount VR to the hoist cylinder 12 on the right side is calculated as a value which enables the oil supply amount ratio VL/VR to be achieved (oil supply amount calculating unit), and the hydraulic pumps 16 and 17 are controlled to be driven based on these oil supply amounts VL and VR (oil supply amount control unit). Further, when the determination of No is made in step 26, after the oil supply amount VR on the right side is fixed in step 28, the oil supply amount VL on the left side is calculated as a value which enables the oil supply amount ratio VL/VR to be achieved (oil supply amount calculating unit), and the hydraulic pumps 16 and 17 are controlled to be driven (oil supply amount control unit).

Thereafter, the processing shifts to step 29 to read preset imbalance determination values f1(PL/PR) and f2 (PL/PR), and then shifts to step 30. As indicated by broken lines in FIG. 9, the imbalance determination values f1(PL/PR) and f2(PL/PR) are threshold values for defining an allowable region E that does not affect the hinges 10, and even if the load balance PL/PR deviates from the solid line in FIG. 9, it can be recognized that there is no risk of affecting the hinges 10 as long as the load balance PL/PR is located within the allowable region E.

In step 30, the hoist cylinder pressures PL and PR are read again, and in step 31, it is determined whether the load balance PL/PR is located within the allowable region E. When the determination is Yes, it is determined in step 32 whether the raising angle θL is less than the discharge upper limit position determination value θ1. When the determination is Yes, the processing returns to step 30. In this case, since there is no risk of affecting the hinges 10, the raising of the cargo bed 9 is continued without further correcting the oil supply amounts VL and VR. When the determination in step 32 becomes No, the oil supply amounts VL and VR are set to 0 in step 33, the hoist cylinders 11 and 12 are stopped in step 34, and the routine is terminated.

Further, when the load balance PL/PR deviates from the allowable region E and the determination of No is made in step 31, the processing returns to step 24. In this case, since the oil supply amount ratio VL/VR can be regarded as being inappropriate, the oil supply amount ratio VL/VR is calculated again from the current load balance PL/PR to set the oil supply amounts VL and VR again. By repeating steps 24 to 29 in this way, the determination in step 31 becomes Yes, and when the determination of No is made in step 32, the processing shifts to step 33.

As described above, in the present embodiment, the left and right hoist cylinder pressures PL and PR are used as an index correlating with the tilt of the cargo bed 9 instead of the roll angle θR of the first embodiment, and the oil supply amount ratio VL/VR to the left and right hoist cylinders 11 and 12, and eventually the oil supply amounts VL and VR are increased or decreased according to the load balance PL/PR obtained from the hoist cylinder pressures PL and PR (steps 26 to 28). Therefore, although no duplicative description is made, the burden on the hinges 10 can be reduced and damage can be prevented.

Moreover, when the oil supply amount ratio VL/VR deviates from the allowable region E during raising of the cargo bed 9, the oil supply amounts VL and VR are re-calculated again from the current load balance PL/PR. Therefore, even in such a case, the appropriate oil supply amounts VL and VR can be maintained, and as a result, the hinges 10 can be more reliably prevented from being damaged.

Third Embodiment

Next, a third embodiment that embodies the present invention will be described. In this embodiment, the pressures in oil chambers on the bottom sides of the front, rear, left and right suspension cylinders 7fl, 7fr, 7rl, and 7rr (hereinafter referred to as suspension cylinder pressures) are adopted as an index correlating with the imbalance of the excavated materials. In order to detect the suspension cylinder pressures, as the cargo bed tilt detecting unit 33, a pair of left and right suspension cylinder pressure detecting sensors 61fl and 61fr (shown in FIGS. 1 to 3) are provided to the suspension cylinders 7fl and 7fr on the front side, and a pair of left and right suspension cylinder pressure detecting sensors 61rl and 61rr (shown in FIGS. 1 to 3) are provided to the suspension cylinders 7rl and 7rr on the rear side. Note that the suspension cylinder pressures are denoted by PFL, PRL for that on the left side and PFR, PRR for that on the right side, thereby distinguishing the suspension cylinder pressures between the left and right sides.

Figure 10:
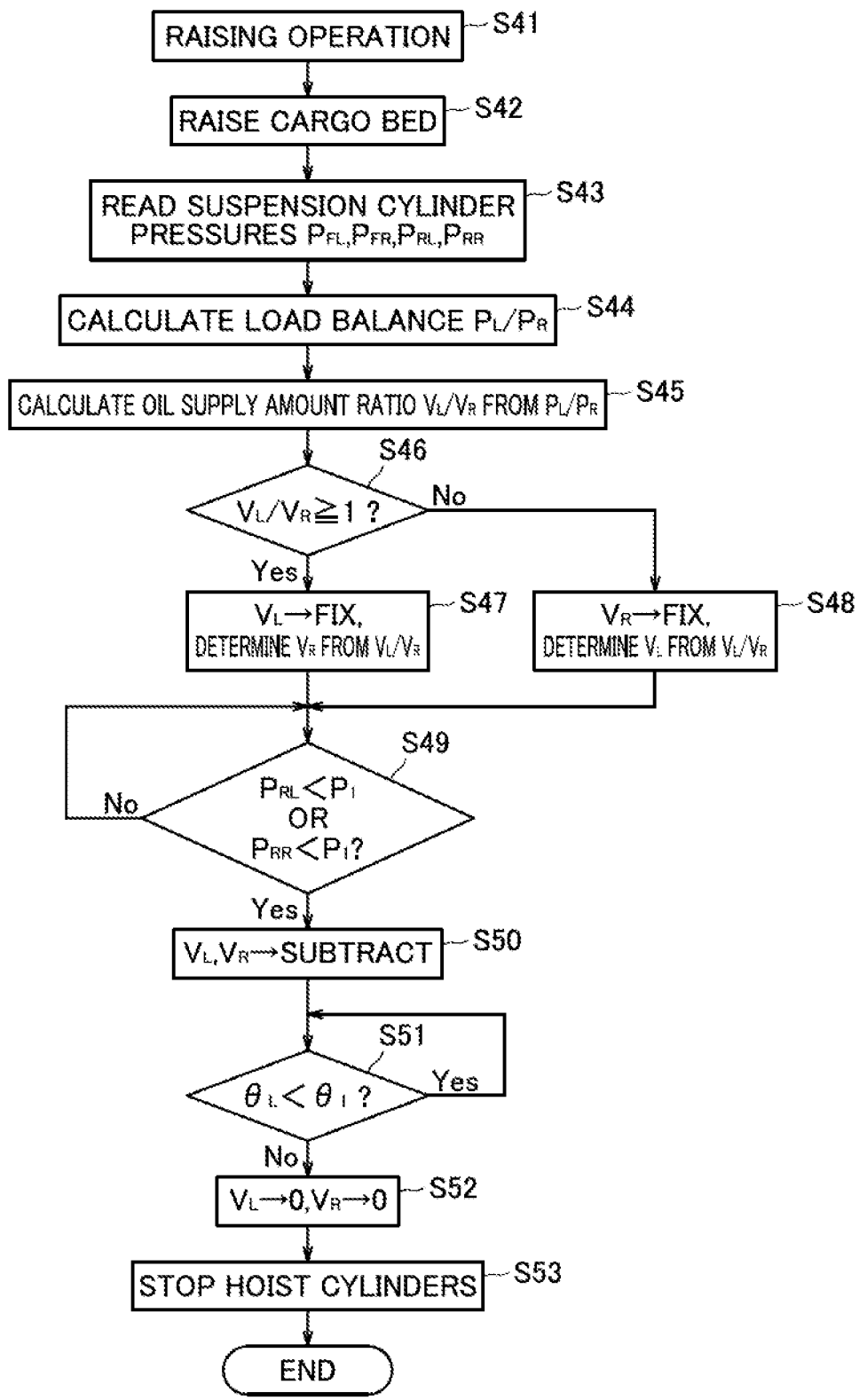
FIG. 10 is a flowchart showing a cargo bed tilt suppressing routine to be executed by a controller of a third embodiment.

When the operating lever 31a of the hoisting operation device 31 is operated to the raising position, the controller 30 executes the cargo bed tilt suppressing routine shown in FIG. 10 at a predetermined control interval.

When the operation to the raising position is performed in step 41, the raising of the cargo bed 9 starts in step 42, and in step 43, the suspension cylinder pressures PFL, PFR of the suspension cylinders 7fl and 7fr on the front side, and the suspension cylinder pressures PRL and PRR of the suspension cylinders 7rl and 7rr on the rear side are read in. Thereafter, the load balance PL/PR is calculated in step 44. Specifically, the front and rear suspension cylinder pressures PFL and PRL on the left side are summed to obtain the left-side suspension cylinder pressure PL while the front and rear suspension cylinder pressures PFR and PRR on the right side are summed to obtain the right-side suspension cylinder pressure PR, and then the ratio therebetween is calculated as the load balance PL/PR.

Thereafter, similarly to steps 25 to 28 of the second embodiment, the oil supply amount ratio VL/VR between the left and right sides is calculated from the load balance PL/PR in step 45, and it is determined in step 46 whether the oil supply amount ratio VL/VR is not less than 1. When the determination in step 46 is Yes, after the oil supply amount VL on the left side is fixed in step 47, the oil supply amount VR on the right side is calculated as a value satisfying the condition of the oil supply amount ratio VL/VR (oil supply amount calculating unit), and the hydraulic pumps 16 and 17 are controlled to be driven based on these oil supply amounts VL and VR (oil supply amount control unit). When the determination in step 46 is No, after the oil supply amount VR on the right side is fixed in step 48, the oil supply amount VL on the left side is calculated as a value satisfying the condition of the oil supply amount ratio VL/VR (oil supply amount calculating unit), and the hydraulic pumps 16 and 17 are controlled to be driven (oil supply amount control unit).

In subsequent step 49, it is determined whether any of the suspension cylinder pressures PRL and PRR on the rear side becomes less than a preset discharge start determination value P1 (discharge start determining unit). The discharge start determination value P1 is a threshold value for determining the start of discharge of excavated materials from the cargo bed 9. When the discharge of the excavated materials is started by the rising of the cargo bed 9, the suspension cylinder pressures PRL and PRR on the rear side sharply decrease, and fall below the discharge start determination value P1. Therefore, it can be regarded that the discharge of the excavated materials has started at the time point when the determination of Yes is made in step 49, and in this case, the processing shifts to step 50. In step 50, preset correction values are subtracted from the oil supply amounts VL and VR.

Figure 11:
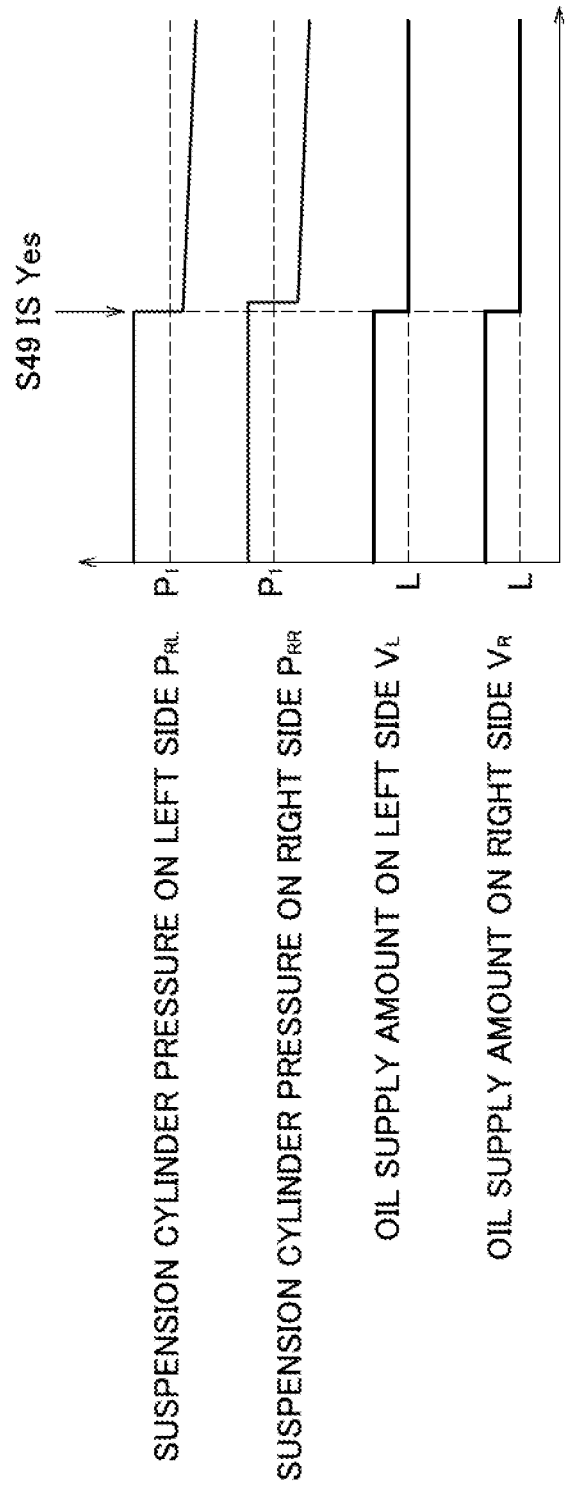
FIG. 11 is a time chart showing a control status of suspension cylinder pressure and an oil supply amount based on the cargo bed tilt suppressing routine.

FIG. 11 is a time chart showing the control status of the suspension cylinder pressures PF and PR and the oil supply amounts VL and VR when the suspension cylinder pressure PRL on the left side antecedently becomes less than the discharge start determination value P1. As shown in this figure, at the time point when the suspension cylinder pressure PRL becomes less than the discharge start determination value P1, the oil supply amounts VL and VR are corrected to decrease down to L by the processing of step 50.

Thereafter, when the raising angle θL becomes equal to or higher than the discharge upper limit position determination value θ1 in step 51, the control of the flow amounts of the hydraulic pumps 16 and 17 is stopped in step 52, the hoist cylinders 11 and 12 are stopped in step 53, and the routine is terminated.

As described above, in the present embodiment, the suspension cylinder pressures PFL, PFR, PRL, and PRR of the suspension cylinders 7fl, 7fr, 7rl, and 7rr on the front, rear, left and right sides are used as the index correlating with the tilt of the cargo bed 9, and the ratio VL/VR of the oil supply amounts to the left and right hoist cylinders 11 and 12, and eventually the oil supply amounts VL and VR are increased or decreased according to the load balance PL/PR determined from the suspension cylinder pressures PFL, PFR, PRL and PRR (steps 46 to 48). Therefore, although no duplicative description is made, the burden on the hinges 10 can be reduced and damage can be prevented.

In addition, the start of discharge of the excavated materials from the cargo bed 9 is determined based on the comparison of the suspension cylinder pressures PRL and PRR on the rear side with the discharge start determination value P1 (step 49), and the oil supply amounts VL and VR to the left and right hoist cylinders 11 and 12 is subtracted (step 50). The center of gravity of the cargo bed 9 is located in front of the hinges 10 before the excavated materials are discharged from the cargo bed 9 being rising, whereas the center of gravity suddenly shifts to the rear side of the hinges 10 immediately after the discharge of the excavated materials is started. This shift of the center of gravity causes a phenomenon called kickback, and the load acting on the hoist cylinders 11 and 12 is reversed, and an excessive load is applied to the vehicle body.

According to the present embodiment, since the oil supply amounts VL and VR are corrected to decrease at the time point when the discharge of the excavated materials is started, so that the subsequent raising speed of the cargo bed 9 is suppressed. Therefore, the discharge speed of the excavated materials is also suppressed, so that the shift of the center of gravity of the cargo bed 9 is more moderate, and the load acting on the vehicle body when the excavated materials are discharged can be reduced. Therefore, there can be obtained another effect in which the durability of the dump truck 1 can be improved.

Note that the processing of steps 29 to 31 of FIG. 8 relating to the allowable region E may be added between steps 48 and 49 in the flowchart of FIG. 10, and although no duplicative description is made, in this case, the action and effect described in the second embodiment can be obtained.

Although the description on the embodiments has been completed, the aspect of the present invention is not limited to the embodiments. For example, the above-mentioned embodiments assume a case where imbalance in the right-and-left direction occurs in excavated materials on the cargo bed 9, but may be embodied as a countermeasure to, for example, a case assuming that the dump truck 1 is stopped on a slope which is inclined in the right-and-left direction. Both the above-mentioned cases have different causes, but are common in that loads received by the left and right hoist cylinders 11 and 12 become unequal to each other due to a tilt occurring in the cargo bed 9, which causes a difference in extension speed between the left and right hoist cylinders 11 and 12, so that the burden on the hinges 10 increases.

Therefore, in the case where the dump truck 1 stops on a slope, the tilt angle in the right-and-left direction of the vehicle body frame 2 with respect to the horizontal posture (which is a tilt angle of the cargo bed 9 in the right-and-left direction, and corresponds to the inclination of the cargo bed of the present invention) may be detected by a tilt angle sensor or the like, and the oil supply amounts VL and VR to the left and right hoist cylinders 11 and 12 may be increased or decreased based on this tilt angle. As a result, similarly to each of the above-described embodiments, the left and right hoist cylinders 11 and 12 may be extended substantially evenly to reduce the burden on the hinges 10.

Figure 12:
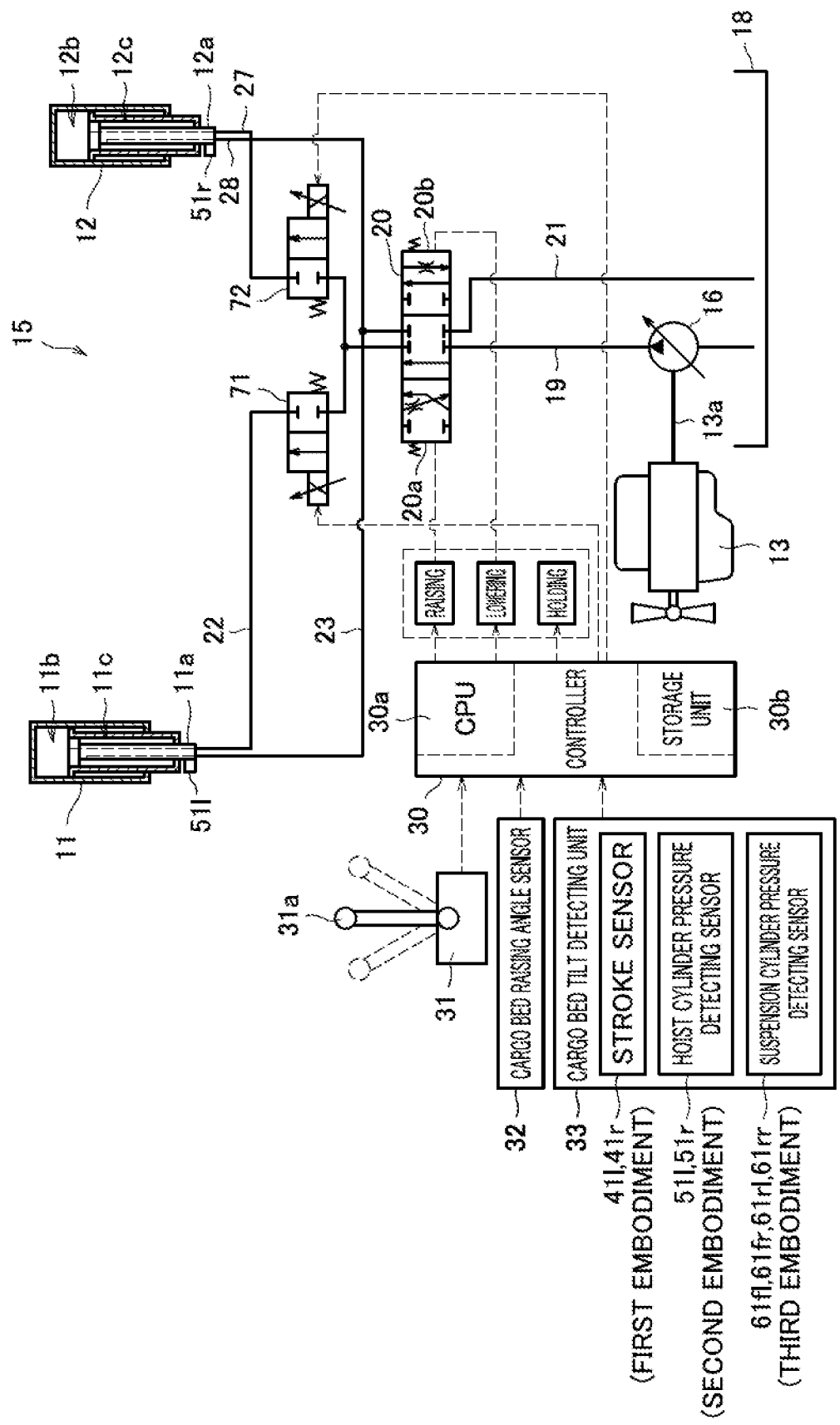
FIG. 12 is a diagram showing another example of the hydraulic circuit of the cargo bed raising and lowering apparatus.

Further, in the above embodiments, the hydraulic circuits of the left and right hoist cylinders 11 and 12 are provided independently of each other, but the present invention is not limited to this manner. For example, as shown in FIG. 12, hydraulic oil discharged from a single hydraulic pump 16 (hydraulic source) driven by an engine 13 may be supplied to a single control valve 20 to switch the control valve 20 according to the operation of the hoisting operation device 31. The hydraulic oil from the control valve 20 may be branched and supplied to a pair of electromagnetic proportional flow amount control valves 71 and 72 (oil supply amount adjusting unit) to control the opening degrees of these flow amount control valves 71 and 72 according to the oil supply amount ratio VL/VR, thereby increasing or decreasing the oil supply amounts VL and VR to the left and right hoist cylinders 11 and 12. Even in this case, the same action and effects as those of the above-mentioned embodiments can be achieved.

EXPLANATION OF REFERENCE SIGNS

1 Dump truck
2 vehicle body frame
3 front suspension (suspension)
5 rear suspension (suspension)
4 front wheel (wheel)
6 rear wheel (wheel)
7*fl*, 7*fr*, 7*rl*, 7*rr* suspension cylinder
9 cargo bed
10 hinges
11, 12 hoist cylinder
13 engine (hydraulic source)
15 cargo bed raising and lowering apparatus
16, 17 hydraulic pump (hydraulic source, oil supply amount adjusting unit)
20, 25 control valve
30 controller (oil supply amount calculating unit, oil supply amount control unit, roll angle calculating unit)
31 hoisting operation device
33 cargo bed tilt detecting unit
41*l*, 41*r* stroke sensor (cargo bed tilt detecting unit)
51*l*, 51*r* hoist cylinder pressure detecting sensor (cargo bed tilt detecting unit)
61*fl*, 61*fr*, 61*rl*, 61*rr* suspension cylinder pressure detecting sensor (cargo bed tilt detecting unit)
71, 72 electromagnetic proportional flow amount control valve (oil supply amount adjusting unit)

The invention claimed is:

1. A cargo bed raising and lowering apparatus of a dump truck in which a cargo bed is connected to a vehicle body frame so that the cargo bed can be raised and lowered pivotally on a hinge, a flow path of hydraulic oil to be discharged from a hydraulic source is switched by a control valve according to an operation of a hoisting operation device to supply the hydraulic oil to each of a pair of hoist cylinders arranged at left and right end portions of the cargo bed in a vehicle width direction, and the cargo bed is raised or lowered according to extension or contraction of the hoist cylinders, the cargo bed raising and lowering apparatus comprising:
an oil supply amount adjusting unit capable of individually adjusting oil supply amounts of the hydraulic oil to the pair of hoist cylinders;
a cargo bed tilt detecting unit for detecting a tilt in the vehicle width direction of the cargo bed;
an oil supply amount calculating unit for calculating the amount of the hydraulic oil to be supplied to each of the hoist cylinders based on the tilt of the cargo bed detected by the cargo bed tilt detecting unit; and
an oil supply amount control unit for controlling the oil supply amount adjusting unit based on the amount of the hydraulic oil to be supplied to each of the hoist cylinders calculated by the oil supply amount calculating unit, wherein
the cargo bed tilt detecting unit includes a pair of stroke sensors for detecting cylinder strokes of the pair of hoist cylinders respectively, comprising a roll angle calculating unit for calculating a roll angle indicating the tilt of the cargo bed with respect to the vehicle body frame based on a difference between the cylinder strokes detected by the pair of stroke sensors.

2. The cargo bed raising and lowering apparatus of a dump truck according to claim 1, wherein the oil supply amount control unit controls each of the oil supply amounts so that the roll angle is smaller than an imbalance determination value which is an upper limit threshold value for controlling the roll angle calculated in the roll angle calculating unit.

3. The cargo bed raising and lowering apparatus of a dump truck according to claim 2, wherein the imbalance determination value gradually decreases as the cargo bed rises.

4. The cargo bed raising and lowering apparatus of a dump truck according to claim 1, wherein the oil supply amount adjusting unit comprises a pair of variable displacement delivery type hydraulic pumps that are respectively provided as the hydraulic source so as to correspond to the pair of hoist cylinders, and can individually adjust discharge amounts of the hydraulic oil therefrom.

5. The cargo bed raising and lowering apparatus of a dump truck according to claim 1, wherein the oil supply amount adjusting unit comprises a pair of flow amount control valves that are respectively provided so as to correspond to the pair of hoist cylinders, and can individually adjust a flow amount of the hydraulic oil to be supplied from the hydraulic source.

6. A cargo bed raising and lowering apparatus of a dump truck in which a cargo bed is connected to a vehicle body frame so that the cargo bed can be raised and lowered pivotally on a hinge, a flow path of hydraulic oil to be discharged from a hydraulic source is switched by a control valve according to an operation of a hoisting operation device to supply the hydraulic oil to each of a pair of hoist cylinders arranged at left and right end portions of the cargo bed in a vehicle width direction, and the cargo bed is raised or lowered according to extension or contraction of the hoist cylinders, the cargo bed raising and lowering apparatus comprising:
- an oil supply amount adjusting unit capable of individually adjusting oil supply amounts of the hydraulic oil to the pair of hoist cylinders;
- a cargo bed tilt detecting unit for detecting a tilt in the vehicle width direction of the cargo bed;
- an oil supply amount calculating unit for calculating the amount of the hydraulic oil to be supplied to each of the hoist cylinders based on the tilt of the cargo bed detected by the cargo bed tilt detecting unit; and
- an oil supply amount control unit for controlling the oil supply amount adjusting unit based on the amount of the hydraulic oil to be supplied to each of the hoist cylinders calculated by the oil supply amount calculating unit, wherein
- the cargo bed tilt detecting unit includes a pair of hoist cylinder pressure detecting sensors for detecting bottom pressures of the pair of hoist cylinders respectively, comprising a roll angle calculating unit for calculating a roll angle indicating the tilt of the cargo bed with respect to the vehicle body frame based on a difference between the pressures detected by the pair of hoist cylinder pressure detecting sensors.

7. The cargo bed raising and lowering apparatus of a dump truck according to claim 6, wherein the oil supply amount calculating unit calculates a load balance in the vehicle width direction of the cargo bed from the bottom pressures, calculates a ratio of the oil supply amounts of the hydraulic oil to the pair of hoist cylinders based on the load balance, and calculates each of the oil supply amounts as a ratio of the oil supply amounts.

8. The cargo bed raising and lowering apparatus of a dump truck according to claim 6, wherein the oil supply amount control unit controls each of the oil supply amounts so that the roll angle is smaller than an imbalance determination value which is an upper limit threshold value for controlling the roll angle calculated in the roll angle calculating unit.

9. The cargo bed raising and lowering apparatus of a dump truck according to claim 8, wherein the imbalance determination value gradually decreases as the cargo bed rises.

10. The cargo bed raising and lowering apparatus of a dump truck according to claim 6, wherein the oil supply amount adjusting unit comprises a pair of variable displacement delivery type hydraulic pumps that are respectively provided as the hydraulic source so as to correspond to the pair of hoist cylinders, and can individually adjust discharge amounts of the hydraulic oil therefrom.

11. The cargo bed raising and lowering apparatus of a dump truck according to claim 6, wherein the oil supply amount adjusting unit comprises a pair of flow amount control valves that are respectively provided so as to correspond to the pair of hoist cylinders, and can individually adjust a flow amount of the hydraulic oil to be supplied from the hydraulic source.

12. A cargo bed raising and lowering apparatus of a dump truck in which a cargo bed is connected to a vehicle body frame so that the cargo bed can be raised and lowered pivotally on a hinge, a flow path of hydraulic oil to be discharged from a hydraulic source is switched by a control valve according to an operation of a hoisting operation device to supply the hydraulic oil to each of a pair of hoist cylinders arranged at left and right end portions of the cargo bed in a vehicle width direction, and the cargo bed is raised or lowered according to extension or contraction of the hoist cylinders, the cargo bed raising and lowering apparatus comprising:
- an oil supply amount adjusting unit capable of individually adjusting oil supply amounts of the hydraulic oil to the pair of hoist cylinders;
- a cargo bed tilt detecting unit for detecting a tilt in the vehicle width direction of the cargo bed;
- an oil supply amount calculating unit for calculating the amount of the hydraulic oil to be supplied to each of the hoist cylinders based on the tilt of the cargo bed detected by the cargo bed tilt detecting unit; and
- an oil supply amount control unit for controlling the oil supply amount adjusting unit based on the amount of the hydraulic oil to be supplied to each of the hoist cylinders calculated by the oil supply amount calculating unit, wherein
- the cargo bed tilt detecting unit includes four suspension cylinder pressure detecting sensors for detecting bottom pressures of suspension cylinders constituting four suspensions that independently suspend four wheels on front, rear, left, and right sides of the dump truck respectively, comprising a roll angle calculating unit for calculating a roll angle indicating the tilt of the cargo bed with respect to the vehicle body frame based on a difference among the pressures detected by the four suspension cylinder pressure detecting sensors.

13. The cargo bed raising and lowering apparatus of a dump truck according to claim 12, wherein the oil supply amount control unit controls each of the oil supply amounts so that the roll angle is smaller than an imbalance determination value which is an upper limit threshold value for controlling the roll angle calculated in the roll angle calculating unit.

14. The cargo bed raising and lowering apparatus of a dump truck according to claim 13, wherein the imbalance determination value gradually decreases as the cargo bed rises.

15. The cargo bed raising and lowering apparatus of a dump truck according to claim 12, wherein the oil supply amount calculating unit calculates a load balance in the vehicle width direction of the cargo bed from the bottom pressures, calculates a ratio of the oil supply amounts of the hydraulic oil to the pair of hoist cylinders based on the load balance, and calculates each of the oil supply amounts as a ratio of the oil supply amounts.

16. The cargo bed raising and lowering apparatus of a dump truck according to claim 12, wherein the oil supply amount adjusting unit comprises a pair of variable displacement delivery type hydraulic pumps that are respectively provided as the hydraulic source so as to correspond to the pair of hoist cylinders, and can individually adjust discharge amounts of the hydraulic oil therefrom.

17. The cargo bed raising and lowering apparatus of a dump truck according to claim 12, wherein the oil supply amount adjusting unit comprises a pair of flow amount control valves that are respectively provided so as to correspond to the pair of hoist cylinders, and can individually adjust a flow amount of the hydraulic oil to be supplied from the hydraulic source.

* * * * *